United States Patent Office 3,321,529
Patented May 23, 1967

3,321,529
POLYPHENYL THIOETHERS
John Robert Campbell, Tarkio, Mo., assignor to Monsanto Company, St. Louis, Mo., a corporation of Delaware
No Drawing. Filed May 19, 1965, Ser. No. 456,905
3 Claims. (Cl. 260—609)

This is a continuation-in-part of application Serial No. 379,727, filed July 1, 1964, now abandoned.

This invention relates to certain novel polyphenyl thioethers which contain a meta-para relationship within their molecules. More particularly this invention relates to m-phenylmercaptophenyl p-phenylmercaptophenyl sulfide, which can also be referred to as 3,4'-bis(phenylmercapto)diphenyl sulfide; m-bis(p-phenylmercaptophenylmercapto)benzene; and p-bis(m-phenylmercaptophenylmercapto)benzene.

The preparation of the compounds of this invention is illustrated in the following example in which parts are parts by weight.

Example

Into a suitable reaction vessel fitted with conventional accessories such as reflux condenser, pot and vapor temperature measuring means, agitation means and heating means, there was charged 500 ml. of dimethylacetamide and 41 parts of 85% potassium hydroxide. After heating the resulting mixture to 90° C., 135.6 parts of m-phenylmercaptothiophenol was added and the resulting reaction mass heated to a pot temperature of about 170° C. During heat-up some low boiling material was taken off. 101 parts of p-chlorodiphenyl sulfide was then charged and the reaction mass held for 8 hours at temperatures in the range of about 165° C.–170° C. Thereafter, the reaction mass was washed with water and extracted with toluene. The toluene extract was then stripped of toluene and the residue distilled and the distillate redistilled to provide 3,4'-bis(phenylmercapto)diphenyl sulfide which had a boiling range of 240° C.–244° C. at 0.08 mm. of mercury, a melting point of 36.5° C.–38.5° C., a thermal decomposition temperature (isoteniscope) of 651° F., and viscosities at 100° F. and 210° F. of 68.01 centistokes and 6.88 centistokes, respectively. Analysis showed the presence of 24% sulfur (theory, 24.8%).

The other compounds of this invention can be prepared by reacting the appropriate phenylmercapto-substituted thiophenol with the appropriate dihalobenzene, generally following the procedure of the foregoing example. For example, p-bis (m-phenylmercaptophenylmercapto)benzenes can be prepared by reacting p-dichlorobenzene with the potassium salt of m-phenylmercaptothiophenol.

The compounds of this invention are useful as functional fluids over wide temperature ranges and in various applications, such as for force transmission fluids for the transmission of pressure, power or torque in fluid pressure or torque actuated mechanisms. Specific examples of such uses are the hydraulic fluids used to transmit fluid pressure to the ram cylinder of hydraulic presses, devices for the absorption and dissipation of energy, such as shock absorbers or recoil mechanisms or the transmission of torque through torque converter type fluid couplings. The compounds of this invention can also be used as a damping fluid which is the liquid composition used for damping mechanical vibrations or resisting other rapid mechanical movements. The compounds of this invention are also suitable for use as a lubricant between relatively moving mechanical parts, as a base for synthetic greases, as a nuclear reactor coolant, as a dielectric, as a vacuum pump fluid and as the liquid material in the filters of air conditioning systems. The instant compounds are particularly well suited for cooling and lubricating metal gears and bearings in jet engines.

When used as functional fluids, the compounds of this invention can be used per se but are especially useful in mixtures with polyphenyl ethers and/or other polyphenyl thioethers or esters. The compounds of this invention can also be used in combination with various addition agents, particularly when used as a synthetic lubricant, such as oxidation inhibitors, rust inhibitors, antifoaming agents, detergents, viscosity index improvers and the like.

While polyphenyl ethers, and particularly the 4- and 5-ring polyphenyl ethers, have been suggested as being useful for synthetic lubricants, especially for high temperature applications, they suffer from a lack of low temperature fluidity. Thus, for example, in the case of the 4-ring polyphenyl ethers, the ether having the lowest melting point is the ether in which the phenoxy group substituted on each phenyl group of the central diphenyl ether portion of the molecule is in the meta position, that is, 3,3'-bis(phenoxy)diphenyl ether; its melting point is about 106° F. If each of the two phenoxy groups is in the para position instead of the meta position, the melting point of the resulting polyphenyl ether, which is 4,4'-bis(phenoxy)diphenyl ether, increases to about 229° F. Furthermore, when one phenoxy group is in the meta position and the other phenoxy group is in the para position, the resulting compound, 3,4'-bis(phenoxy)diphenyl ether, has a melting point lying between 3,3'- and 4,4'-bis(phenoxy)diphenyl ether, specifically about 116° F.

Earlier work with the 4-ring polyphenyl thioethers indicated that they would follow the same general pattern of melting points as the analogous 4-ring polyphenyl ethers. Thus, 3,3'-bis(phenylmercapto)diphenyl sulfide has a melting point of 133° F., while 4,4'-bis(phenylmercapto)diphenyl sulfide melts at a considerably higher temperature, specifically about 232° F. It would be expected, therefore, that 3,4'-bis(phenylmercapto)diphenyl sulfide would have a melting point between the 3,3'- and 4,4'-isomers and that it would melt at a slightly higher temperature than the analogous 3,4'-bis(phenoxy)diphenyl ether.

The compounds of this invention, however, possess the unique and unexpected property of having a melting point lower than that which would be predictable from the properties of other polyphenyl ethers and polyphenyl thioethers while still retaining good high temperature stability. The unexpected low melting point of 3,4'-bis(phenylmercapto)diphenyl sulfide is illustrated by the data in the table below which shows the melting points of various 4-ring polyphenyl ethers and polyphenyl thioethers, including 3,4'-bis(phenylmercapto)diphenyl sulfide.

| Compound: | Melting point, ° F. |
|---|---|
| 3,3'-bis(phenoxy)diphenyl ether | 106 |
| 3,4'-bis(phenoxy)diphenyl ether | 116 |
| 4,4'-bis(phenoxy)diphenyl ether | 229 |
| 3,3'-bis(phenylmercapto)diphenyl sulfide | 133 |
| 3,4'-bis(phenylmercapto)diphenyl sulfide | 100 |
| 4,4'-bis(phenylmercapto)diphenyl sulfide | 232 |

Similarly, m - bis(p - phenylmercaptophenylmercapto)benzene has a melting point of about 148° F. whereas m-bis(p-phenoxyphenoxy)benzene melts at about 191° F. p - Bis(m - phenylmercaptophenylmercapto)benzene also has an unexpectedly low melting point.

From the above, it is readily apparent that the compounds of this invention are unique and possess unexpected properties which make them well suited for the uses disclosed above.

While this invention has been described with respect to various specific examples and embodiments, it is understood that the invention is not limited thereto and that it can be variously practiced within the scope of the following claims.

The embodiments of the invention in which an exclusive property or privilege is claimed are defined as follows:

1. A compound selected from the group consisting of m-phenylmercaptophenyl p-phenylmercaptophenyl sulfide, p-bis(m-phenylmercaptophenylmercapto)benzene and m-bis(p-phenylmercaptophenylmercapto)benzene.

2. m-Phenylmercaptophenyl p-phenylmercaptophenyl sulfide.

3. m-Bis(p-phenylmercaptophenylmercapto)benzene.

No references cited.

CHARLES B. PARKER, *Primary Examiner.*

JOSEPH P. BRUST, *Examiner.*

DELBERT R. PHILLIPS, *Assistant Examiner.*